(12) United States Patent
Hägg

(10) Patent No.: US 9,377,340 B2
(45) Date of Patent: Jun. 28, 2016

(54) MONITORING OF FLOATING ROOF TANK

(75) Inventor: Lennart Hägg, Kungsbacka (SE)

(73) Assignee: Rosemount Tank Radar AB, Gothenburg (SE)

( * ) Notice: Subject to any disclaimer, the term of this patent is extended or adjusted under 35 U.S.C. 154(b) by 1131 days.

(21) Appl. No.: 13/294,364

(22) Filed: Nov. 11, 2011

(65) Prior Publication Data

US 2013/0120155 A1 May 16, 2013

(51) Int. Cl.
*G08C 19/16* (2006.01)
*G01F 23/00* (2006.01)
*G01F 23/284* (2006.01)
(Continued)

(52) U.S. Cl.
CPC ............... *G01F 23/00* (2013.01); *B65D 88/34* (2013.01); *B65D 90/48* (2013.01); *G01F 23/0069* (2013.01); *G01F 23/284* (2013.01); *G01S 13/87* (2013.01); *G01S 13/88* (2013.01); *H01Q 1/2233* (2013.01); *H04Q 9/00* (2013.01); *B65D 2590/0083* (2013.01); *G01S 7/003* (2013.01);
(Continued)

(58) Field of Classification Search
CPC ......... G01F 25/00; G01F 17/00; G01N 19/00; G06F 15/46; H01M 10/46; H01M 10/44; H02P 5/162
USPC ......... 340/612, 870.01; 702/51, 65; 73/865.8, 73/1.73; 320/107; 388/803; 700/266; 429/53; 116/227; 141/95; 180/65.1
See application file for complete search history.

(56) References Cited

U.S. PATENT DOCUMENTS 2,677,816 A    5/1954   Quist
4,897,797 A *  1/1990   Free et al. ..................... 700/266
(Continued)

FOREIGN PATENT DOCUMENTS

DE         44 11 478       11/1994
WO         WO 94/26627     11/1994
(Continued)

OTHER PUBLICATIONS

International Search Report and Written Opinion for PCT Application No. PCT/SE2012/000171, dated Mar. 15, 2013, 15 pages.
(Continued)

*Primary Examiner* — Curtis King
(74) *Attorney, Agent, or Firm* — Westman, Champlin & Koehler, P.A.

(57) ABSTRACT

System for monitoring a floating roof of a tank containing a liquid, wherein the system determines a local status of the floating roof in spaced apart sensing element locations. In a hazardous or potentially hazardous environment, there is an on-roof subsystem including a sensing element in each sensing element location, intrinsically safe measuring circuitry coupled a sensing elements and arranged for determining said local status, intrinsically safe radio communication on-roof circuitry coupled for communicating externally of the on-roof subsystem the local, an intrinsically safe power supply circuitry connected to an intrinsically safe and interchangeable energy storage unit for powering the on-roof subsystem. The system further includes monitoring circuitry for receiving the indication of local status and for determining an overall monitored status of said floating and further radio communication circuitry. The on-roof subsystem is wireless in its power supply and communication.

26 Claims, 2 Drawing Sheets

Figure 1:
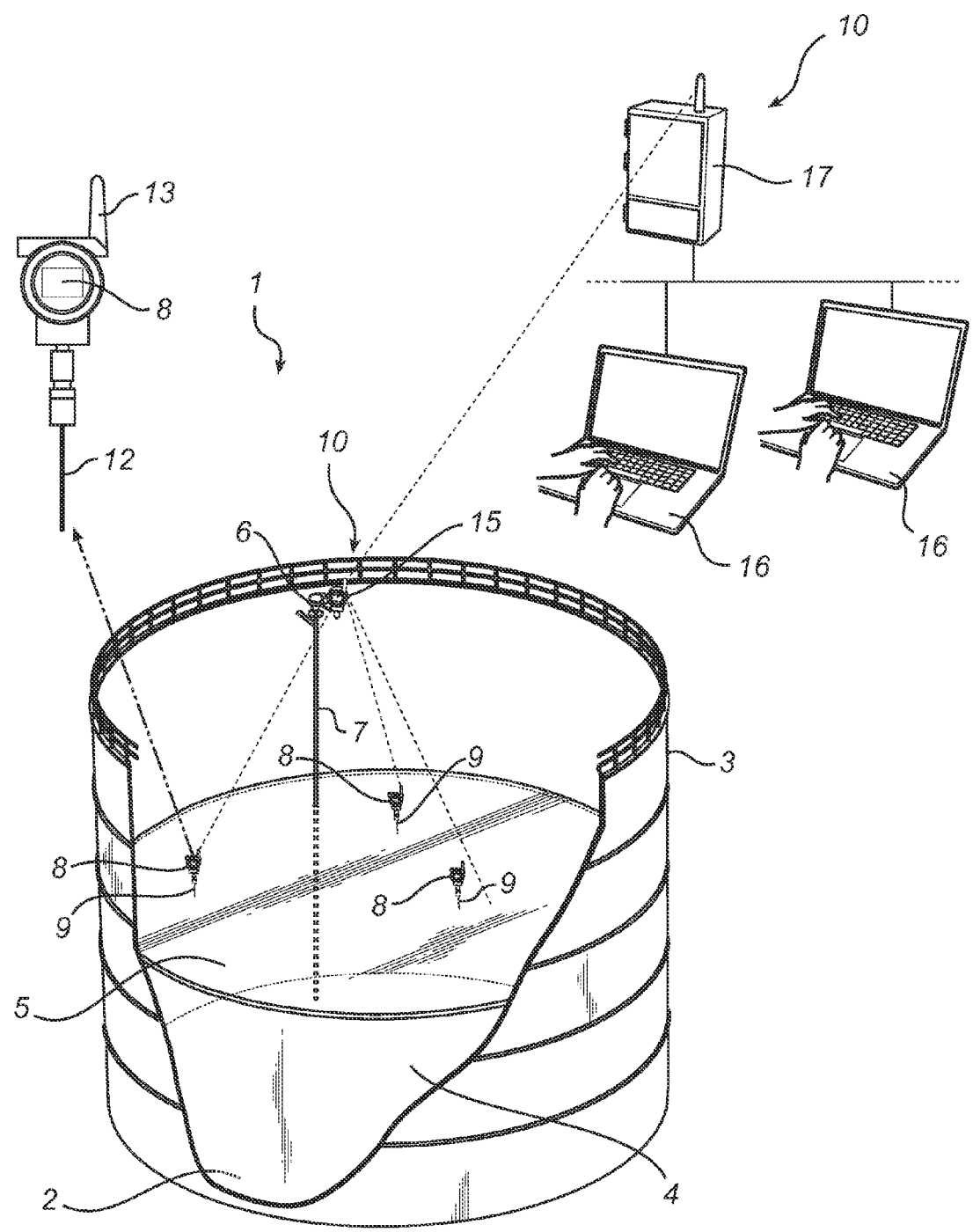

(51) Int. Cl.
*H04Q 9/00* (2006.01)
*B65D 88/34* (2006.01)
*B65D 90/48* (2006.01)
*G01S 13/87* (2006.01)
*G01S 13/88* (2006.01)
*H01Q 1/22* (2006.01)
*G01S 7/00* (2006.01)

(52) U.S. Cl.
CPC ...... *H04Q 2209/40* (2013.01); *H04Q 2209/823* (2013.01); *H04Q 2209/88* (2013.01)

(56) References Cited

U.S. PATENT DOCUMENTS

| | | | |
|---|---|---|---|
| 5,455,884 A * | 10/1995 | Yang | 388/803 |
| 7,284,428 B1 * | 10/2007 | Hoben et al. | 340/612 |
| 7,550,943 B2 * | 6/2009 | Spartano et al. | 320/107 |
| 8,624,748 B1 * | 1/2014 | Grasty, Jr. | B65D 88/34 340/540 |
| 8,800,395 B2 * | 8/2014 | Tzonev et al. | 73/865.8 |
| 2005/0139399 A1 * | 6/2005 | Gopal | 180/65.1 |
| 2005/0159905 A1 * | 7/2005 | Bond et al. | 702/51 |
| 2006/0243347 A1 * | 11/2006 | Humphrey | 141/95 |
| 2008/0282794 A1 | 11/2008 | Jirskog | |
| 2009/0243863 A1 | 10/2009 | Lease | |
| 2011/0174399 A1 * | 7/2011 | Tzonev | H04Q 9/00 137/553 |
| 2011/0231127 A1 * | 9/2011 | DiRienzo et al. | 702/65 |
| 2012/0073354 A1 * | 3/2012 | Joosten et al. | 73/1.73 |
| 2014/0039816 A1 * | 2/2014 | Van Bekkum | B65D 90/48 702/55 |
| 2014/0111642 A1 * | 4/2014 | Tzonev | B65D 90/48 348/143 |

FOREIGN PATENT DOCUMENTS

| | | |
|---|---|---|
| WO | WO 99/27344 | 6/1999 |
| WO | 2008/010702 A1 | 1/2008 |
| WO | WO 2009/121169 A1 | 10/2009 |
| WO | WO 2009/148397 | 12/2009 |
| WO | WO 2010/035201 A2 | 4/2010 |

OTHER PUBLICATIONS

European Search Report from EP 12847824.5, dated Nov. 25, 2015.

* cited by examiner

MONITORING OF FLOATING ROOF TANK

FIELD OF THE INVENTION

The present invention relates to a monitoring system for monitoring a floating roof of a floating roof tank and to a monitoring method for monitoring a floating roof of a floating roof tank. The invention further relates to a method of re-powering a monitoring system for monitoring a floating roof of a floating roof tank.

BACKGROUND OF THE INVENTION

In large liquid tanks, in particular fuel and oil tanks at refineries and the like, which are capable of holding large amounts of oil products, use is frequently made of a floating roof which floats on the liquid in the tank and is therefore displaceable in a vertical direction. Thus, the floating roof is capable of following the level of a liquid (oil product) when the liquid is discharged from or filled into the tank. Floating roofs of this type are used for preventing leakage of vapors and gases from the tank into the atmosphere and ingress of e.g. rainwater from the surroundings into the liquid. Typically, the prevention of leakage and ingress is enhanced by a sealing arrangement fitted along a perimeter of the floating roof for providing sealing and sliding contact with an inner wall of the tank. Further, using a roof that floats on the liquid enables minimizing a space between the liquid and the roof and thereby minimizing the amount of gases and liquid in vapor form in this space. In case of fuel and oil tanks, the environment on top of the floating roof is a hazardous or potentially hazardous environment.

Floating roofs for these purposes are usually manufactured as large steel structures with float means (pontoons) and have a weight in the order of a hundred tons and a diameter of tens of meters. With regard to size and environmental aspects, it is important to monitor the normal operation and undisturbed floating of the floating roof, such that disturbance thereof is identified at an early stage. Consequently, it is also important that any interruption of the monitoring of the floating roof is limited.

Different situations of disturbance to normal operation and floating have been observed in the past.

In filling of the tank, part of the floating roof could get stuck to the inner wall of the tank. As the filling proceeds the floating roof will be partially flooded by liquid, with a potentially hazardous situation as a result, should gas or vapor so produced be explosive or otherwise harmful. The roof structure braking could lead to an even more severe result.

In discharging of the tank, part of the floating roof could get stuck to the inner wall of the tank. As the discharging proceeds considerable amounts of air could enter the space between the liquid and the floating roof. In the subsequent event of a roof collapse, an explosive atmosphere could form above the oil and the collapsed roof.

Regulations tend to become stricter to minimize evaporation of liquid from floating roof tanks. This has resulted in floating roof designs which give a higher friction in the sealing arrangement between the perimeter of the floating roof and the inner wall of the tank. This increase in friction could increase the risk of a roof getting stuck.

Abnormal function and floating may similarly occur if a large amount of rain or snow is present or unevenly distributed on the roof. This could cause the roof to sink or tilt and collapse. Also liquid leakage into the float means (pontoons) of the floating roof may cause a roof to partially sink and become flooded with liquid.

For years, issues like those described above have attracted attention in the petroleum industry. There seems to be an increasing demand for systems that address the issues.

Existing monitoring of floating roofs is based on measuring relative positions or inclinations of several locations on the floating roof when in operation. There is also monitoring that combines this with, for instance, video monitoring or detection of the presence of gas on top of the floating roof.

Monitoring systems have been suggested in the past, in which relative vertical positions of several locations of the floating roof have been measured and communicated. These vertical positions are relative to a reference point of the tank or to a level of the liquid in the respective location.

It has been further suggested to provide a battery and solar cell powered monitoring system for monitoring a floating roof, in which inclination and liquid sensors are located on the roof and arranged to wirelessly communicate a status of the sensors.

It is believed that any existing or previously described monitoring systems for floating roofs have either been too complicated or otherwise lacked in ease of applicability in hazardous or potentially hazardous environments of floating roof tanks and thus have not been used in any large extent.

SUMMARY OF THE INVENTION

In hazardous or potentially hazardous environment monitoring of floating roofs, in addition to enabling efficient installation and providing a safe and reliable monitoring function, it is of utmost importance according to the inventor to maximize life of the monitoring system, minimize any system maintenance, and minimize any system down time. An unnecessary complexity of the monitoring system should also be avoided.

The invention is directed towards providing a wireless monitoring system, in the sense that communication is wireless from floating roof and that power is provided locally on the floating roof be means of an energy storage unit, such as a long life battery. According to the invention, such an energy storage unit needs to be interchangeable in the field environment of a fuel or oil tank, that is, in a hazardous or potentially hazardous environment. One reason for this is that the life of other parts of the monitoring system can be designed for a substantially longer life than that of energy storage units known to date. Therefore the energy storage unit needs to be readily interchangeable. Another reason is that the most frequent maintenance, requiring physical access to roof mounted devices of the monitoring system can be foreseen to be the re-powering of the wirelessly operation devices of the system. Yet another reason is that a field environment changing of the energy storage unit only will give as little system down time as possible.

The invention provides systems and methods for monitoring a floating roof of a floating roof tank and technically attaining interchangeability of the energy storage unit or units as well as a method of re-powering the wireless means.

More specifically, the invention provides a monitoring system for monitoring a floating roof of a floating roof tank containing a liquid and having a bottom, a cylindrical wall, a floating roof floating on said liquid, wherein a local status of said floating roof is to be measured in at least three spaced apart sensor element locations of said floating roof.

The monitoring system further comprises an on-roof sub-system comprising at least three sensing elements, wherein one of said sensing elements is fixed in each one of said spaced apart sensor element locations on said floating roof, at least one intrinsically safe measuring circuitry, wherein each one of said sensing elements is coupled to said at least one measuring circuitry for determining in said at least one measuring circuitry said local status of each one of said sensor elements location of said floating roof, at least one intrinsically safe radio communication on-roof circuitry coupled to at least one of said measuring circuitry and including a communication antenna for communicating externally of said on-roof system an indication of at least one of said local status, at least one intrinsically safe power supply circuitry for powering said measuring circuitry and said radio communication circuitry, and having a power supply circuitry connection interface, and at least one intrinsically safe and interchangeable energy storage unit having an energy storage unit connection interface coupled to said power supply circuitry connection interface.

The monitoring system further comprises monitoring circuitry for receiving said indications of said local status from each of said sensor units and for determining an overall monitored status of said floating roof based on at least one of said indications of said local status.

The monitoring system further comprises an off-roof subsystem comprising a radio communication off-roof circuitry arranged to communicate wirelessly with at least one of said sensor units and arranged to convey externally of said on-roof subsystem at least one of said indications of said local status or said monitored overall status of said floating roof.

In order for the interchangeability of energy storage units to be practically attainable according to the invention, there are electrical parameters defined for said power supply circuitry connection interface and for said energy storage unit connection interface. These parameters are made to match each other within an intrinsic safety context, so as to enable coupling and de-coupling of said energy storage unit from said power supply circuitry in an intrinsically safe manner in a hazardous or potentially hazardous environment present on top of the floating roof.

The interchangeability of the energy storage units is enhanced according to the invention by said power supply circuitry connection interface having power supply circuitry electro-mechanical contact terminals and said energy storage unit connection interface having energy storage unit electro-mechanical contact terminals. In operation, respective ones of these terminals are kept in conductive electric contact with each other across the interfaces of the power supply circuitry and the energy storage units, respectively. This is achieved by releasable pressure means, such as a threaded cover lid, fastening screws, a latch mechanism or similar, in order to provide ease of interchangeability of said energy storage unit.

It is regarded to be a great benefit in monitoring of a floating tank roof to know the relative height of the roof at the sensing locations, and for practical reasons respective reference points thereof, to the local height of the liquid. This relative level measurement gives direct information of how the floating roof floats in the liquid at each sensing element location and an opportunity to generate an earlier warning that floating has become abnormal compared to for instance monitoring the flooding of the top of the roof.

A basic level measurement function that provides a level as local status may involve indicating that the local level reading belongs to a high level range or a low level range. This would enable concluding that the floating roof floats abnormally low (possibly leakage of a float element of the roof) or abnormally high (possibly sticking of the roof perimeter to the tank wall while discharging liquid), respectively. It would be advantageous to complement the two foregoing categories of the level with an intermediate range. When communicating that the local level reading belongs to such a range, the local status would indicate normal floating in sensing element location in question.

An even more elaborate level determination will enable an even better overall status determination for the floating roof. Continuous measurement of liquid level as the local status of the floating roof at said sensing element location will enable communication. Several different gauging technologies could provide measure accuracies in the range of 0.0001-0.1 meters. It is preferred that the accuracy belongs to a range of 1 millimeter though 5 centimeters. When the monitoring system delivers continuous level measurement, conclusions can be drawn regarding the tilt or local tilt of the roof. This could even be related to wind and other weather condition in order to determine whether any faulty floating is a result of malfunction of the roof itself or has other causes.

When the system is to communicate normal and abnormal level ranges as discussed above and related overall status or when handling alarms or emergencies, it is advantageous to enable the setting of threshold level values by mechanical means or, especially in continuous level measurement, electrical means. Such electrically set threshold levels can be set in software in the on-roof subsystem or elsewhere.

It is preferred in the invention to provide a gauging unit in each sensing element location on the floating roof. Each one of the gauging units preferably includes a sensing element and a measuring circuitry, and a power supply circuitry. The sensing units could each have one radio communication on-roof circuitry and an energy storage unit or they could share such means. Even monitoring circuitry could belong to each gauging unit. The on-roof subsystem could include electrical wiring for interconnecting gauging units at different sensing element locations, in particular for sharing resources like power supply circuitry, one or more energy storage units, and radio communication on-roof circuitry.

The intention in the inventive monitoring system is to provide a communication function and a power supply function, including energy storage, of said on-roof subsystem that is completely wireless in relation to any off-roof electrical circuitry. This means that there will no electrical wires between the on-roof subsystem when the floating roof tank is in operation and its floating roof may potentially move up or down.

The monitoring system may advantageously handle alarms, wherein a first alarm is communicated when a local level of said liquid exceeding a predetermined high threshold value and a second alarm is communicated when a local level of said liquid is less than a predetermined low threshold value.

For the robustness and reliability it is strongly preferred that the radio communication of the monitoring system form a radio network of mesh type, or a part of such a network. In this case the radio communication off-roof circuitry includes at least one radio repeater circuitry, preferably located at a top of said tank wall. The off-roof subsystem preferably comprises further radio communication system circuitry, normally a radio gateway for coupling the monitoring system to a superior control system at a location remote to the floating roof tank. The radio communication on-roof circuitry is then arranged to communicate with the superior control system via the radio communication off-roof circuitry and the radio communication system circuitry.

The system could further include a local alarm device arranged to produce an alarm signal in a vicinity of the floating roof tank in dependence of at least one of the indications of said local status or the monitored overall status of said floating roof. The radio communication off-roof circuitry is then arranged to convey to said local alarm device at least one of said indications of said local status or said monitored overall status of said floating roof. In a similar way, the system could include a local emergency shutdown device arranged to control at least one of a pump and a valve associated with operation of said floating roof tank in dependence of at least one of said indications of said local status or said monitored overall status of said floating roof. The radio communication off-roof circuitry is then arranged to convey to the emergency shutdown device at least one of the indications of said local status or the monitored overall status of said floating roof.

In the inventive system, the sensing elements may operate according to at least one gauging technology in the set consisting of: continuous non-contacting radar level gauging, switch non-contacting radar level gauging, continuous guided wave radar gauging, switch guided radar level gauging, ultrasonic level gauging, switch vibrating fork gauging, pressure gauging, capacitive gauging, laser gauging, inclinometer gauging, gas detection gauging, wind speed and direction gauging, atmospheric pressure gauging. The presently most preferred gauging technology is continuous guided wave radar level gauging, since it will provide the benefits of continuous level measurement and a long life of the energy storage units, since it can be made to consume very little power.

The invention further includes a method of monitoring a floating roof of a floating roof tank containing a liquid and having a bottom, a side wall, a floating roof floating on said liquid. This method is applicable in a setting and with functions corresponding to those described above in relation to the monitoring system. This inventive method comprises: determining a local status of said floating roof in at least three spaced apart sensing element locations of said floating roof, said method comprising arranging on said floating roof: at least three sensing elements, wherein one of said sensing elements is fixed in each one of said spaced apart sensor element locations on said floating roof, at least one intrinsically safe measuring circuitry, wherein each one of said sensing elements is coupled to said at least one measuring circuitry for determining in said at least one measuring circuitry said local status of each one of said sensor elements location of said floating roof, at least one intrinsically safe radio communication on-roof circuitry coupled to at least one of said at least one measuring circuitry and including a communication antenna for communicating externally of said on-roof system an indication of at least one of said local status, at least one intrinsically safe power supply circuitry for powering said at least one measuring circuitry and said at least one radio communication circuitry, and having an intrinsically safe power supply circuitry connection interface, at least one intrinsically safe and interchangeable energy storage unit having an intrinsically safe energy storage unit connection interface and coupling said intrinsically safe energy storage unit connection interface to said power supply circuitry connection interface, said method further comprising arranging: monitoring circuitry and thereby receiving said indications of said local status from each of said sensor units and for determining an overall monitored status of said floating roof based on at least one of said indications of said local status, said method further comprising arranging off said floating roof: a radio communication off-roof circuitry and thereby communicating wirelessly with at least one of said sensor units and arranged to convey externally of said on-roof subsystem at least one of said indications of said local status or said monitored overall status of said floating roof.

The invention further includes a method of re-powering the inventive monitoring system. More specifically, the aim is to re-power the on-roof subsystem. The method of re-powering is applicable in a setting and with functions corresponding to those described above in relation to the monitoring system and the method of monitoring. This is a method of re-powering a monitoring system for monitoring a floating roof of a floating roof tank containing a liquid and having a bottom, a cylindrical wall, a floating roof floating on said liquid, said system being arranged to determine a local status of said floating roof in at least three spaced apart sensing element locations of said floating roof, and said system comprising an on-roof subsystem comprising: at least three sensing elements, wherein one of said sensing elements is fixed in each one of said spaced apart sensor element locations on said floating roof, at least one intrinsically safe measuring circuitry, wherein each one of said sensing elements is coupled to said at least one measuring circuitry for determining in said at least one measuring circuitry said local status of each one of said sensor elements location of said floating roof, at least one intrinsically safe radio communication on-roof circuitry coupled to at least one of said at least one measuring circuitry and including a communication antenna for communicating externally of said on-roof system an indication of at least one of said local status, at least one intrinsically safe power supply circuitry for powering said at least one measuring circuitry and said at least one radio communication circuitry, and having an intrinsically safe power supply circuitry connection interface, at least one original intrinsically safe and interchangeable energy storage unit having an intrinsically safe original energy storage unit connection interface coupled to said power supply circuitry connection interface, said monitoring system further comprising: monitoring circuitry for receiving said indications of said local status from each of said sensor units and for determining an overall monitored status of said floating roof based on at least one of said indications of said local status, said monitoring system further comprising an off-roof subsystem comprising: a radio communication off-roof circuitry arranged to communicate wirelessly with at least one of said sensor units and arranged to convey externally of said on-roof subsystem at least one of said indications of said local status or said monitored overall status of said floating roof, said method comprising: receiving an indication from said monitoring system of the need to re-power said monitoring system, entering into a hazardous or potentially hazardous environment present on said floating roof a replacement intrinsically safe and interchangeable energy storage unit having an intrinsically safe replacement energy storage unit connection interface, de-coupling in said hazardous or potentially hazardous environment present on said floating roof one of said at least one original interchangeable energy storage unit from by separating a respective original energy storage unit connection interface from a respective power supply circuitry connection interface, coupling in said hazardous or potentially hazardous environment present on said floating roof said replacement intrinsically safe and interchangeable energy storage unit to said respective power supply circuitry connection interface, wherein respective power supply circuitry connection interface, respective original energy storage unit connection interface have matching interface parameters, and wherein respective power supply circuitry connection interface, respective replacement energy storage unit connection interface have matching interface parameters. The re-powering can be expressed as a use of the inventive monitoring system.

Figure 2:
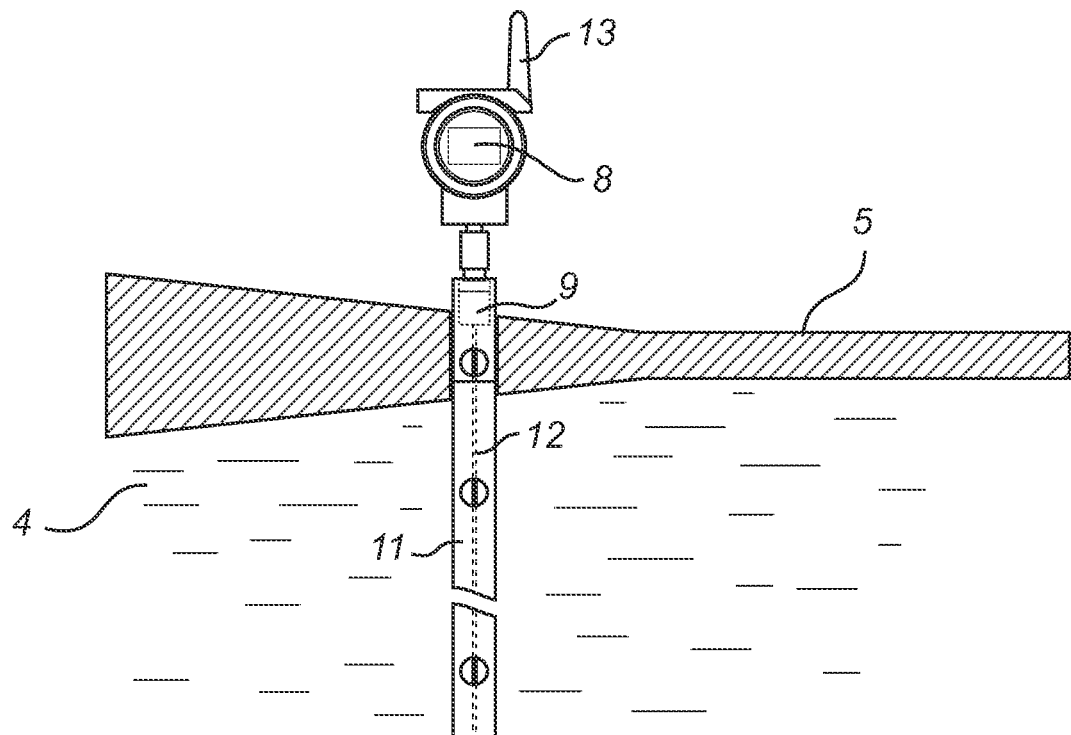
Figure 3:
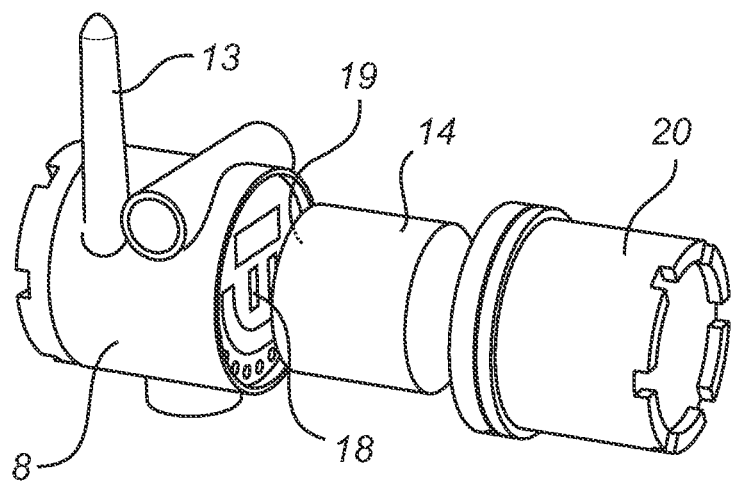

Embodiments of the invention will be described more fully below with reference to the drawing, in which FIG. 1 shows a floating roof tank and the monitoring system of an embodiment of the invention as applied to the floating roof tank, FIG. 2 shows a radar level gauge mounted in a support leg opening of the floating roof according to one embodiment of the invention, and FIG. 3 shows a gauging unit, including an interchangeable energy storage unit, as applied in a sensing element location according to an embodiment of the invention.

DESCRIPTION OF PREFERRED EMBODIMENTS OF THE INVENTION

With reference to FIGS. 1 through 3, embodiments of the invention is applied to a large floating roof tank 1 having a bottom 2 and a side wall 3. The tank 1 is made of steel and has a diameter of several tens of meters. The tank contains liquid oil 4 or a petroleum product on top of which a floating roof 5 floats by means of floats (not shown) integrated with the floating roof 5. The floating roof 5 has a seal (not shown) along its perimeter for limiting the passage of liquid and gas between the floating roof 5 and an inside of the side wall 3. As the skilled person will appreciate, the floating roof tank 1 and its associated equipment may further include pipes attachments, pipes, valves, actuators for filling and discharging the oil, and various measuring and control devices et cetera. In particular, the tank 1 is equipped with a oil level gauge 6 that measures a filling level of the oil 4 relative to a reference point of the tank 1 and, more specifically, often a datum plate of the tank 1. Such an oil level gauge 6 is typically installed on top of a still pipe 7 in the form of a pipe arranged vertically from a top of the side wall 3, through an opening in the floating roof 5, and through the oil 4 towards the bottom 2.

The floating roof 5 normally floats generally horizontally on the oil 4 and follows the oil level during filling or discharging. However, potentially this normal floating could become faulty in various situations and by various causes as indicated herein.

Determining faulty floating at an early stage is of essence, since a capsizing, sinking, breaking or other resulting fault could then be avoided by appropriate measures. Such measures include halting a filling or discharge of the oil, re-filling or re-discharging a certain oil volume, rushed emptying the tank to an oil level where the floating roof has mechanical support against the bottom, and alerting personnel working in the tank environment.

A particularly quick and accurate way of determining whether a fault in the floating of the floating roof 5 has occurred has been found to involve installation of radar level gauges 8 at several spaced apart sensing locations 9 of the floating roof 5. These level gauges 8 measure the local status of the respective sensing locations 9 as the level of the oil 4 relative to a vertical reference point of the floating roof in the respective sensing locations 9. The level measurement could be continuous within a relevant range or have a switch characteristic for at least an abnormal high level and an abnormal low level. Applying only abnormal high level switch characteristic would provide valuable information, but it is presently believed that measuring at least two levels is the highly preferable way.

The tank 1 is thus equipped with a monitoring system 10 for monitoring the floating roof 5. The monitoring system 10 aims at measuring a local status expressed as a local oil level relative to said floating roof 5 in each sensing location 9. Then the monitoring system 10 determines an overall status of the floating roof 5 based on the said local oil levels. Such overall status may include states normal floating or abnormal floating, wherein the abnormal floating state includes a combination of out of range level values and their respective sensing locations. Even further processing of the foregoing would be possible to determine the occurrence of one of several predetermined faulty floating states of the floating roof 5. The oil level measuring is carried out in at least three spaced apart sensing element locations 9 of said floating roof 5. Preferable sensing element locations 9 will vary depending on a specific mechanical design of a floating roof 5 and tank 1. It is presently believed that the most preferable sensing element locations are off-center on the floating roof and distributed as evenly and close to the roof perimeter as possible. However, for post-installation of the monitoring system in an already operating tank 1, it will be very advantageous to use as sensing element location openings 10 that are already present in the floating roof 5. Such already made openings 10 may include openings for roof legs 11 or other openings, such as various inspection openings, generally with a cover fitted when the floating roof tank is in operation. Roof legs 11 are generally used for supporting the floating roof 5 at a lowest height when a tank is completely empty of its oil 4 content.

The monitoring system has an on-roof subsystem. This subsystem includes the radar level gauges 8. Each one of these units is located at one of the sensing element locations 9. The number of sensing element locations 9 and the number of level gauges 8 is determined by the specific designs of the floating roof tank 1 and the floating roof 5. A larger roof could require more sensing element locations 9 and level gauges 8 than a smaller roof. However, it is believed that three of each is a minimum number, although it may be a fully sufficient number in many situations, especially where the distribution thereof is substantially equidistant along the perimeter of the floating roof 5. Since the positional selection sensing element locations may be limited to locations at which the floating roof 5 already has openings 10 from a top side to a bottom side of the floating roof, a greater number of sensing element locations and level gauging units may be used if the sensing element locations are less advantageous from a monitoring point of view.

In the most preferred embodiment of the invention the level gauging units are radar level gauges 8 of a type using a single or dual conductor probe 12 as the sensing element. The probe 12 acts as a waveguide and is normally partially submerged in the oil 4 of the tank 1. Radar in this sense shall be understood as an indication that the level gauging unit operates by sending and receiving electromagnetic signals along the probe. At any distinct changes of impedance for signals propagating along this probe 12, for instance, where it penetrates the surface of the oil 4, there will be a reflection of the sent electromagnetic signals. By determining the time that the signal travels to the surface and back (at a known speed), the radar level gauge 8 will determine the distance to the surface. Several different radar level gauging methods of signal generation and processing are known and can be used in the inventive system. It would also be possible to use non-contacting radar level gauging, wherein the electromagnetic signals are sent and received via a gauging antenna. One important condition, however, is that the technology used for level gauging has a low power consumption, in order to render a long period of operation prior to requiring re-powering.

Each radar level gauge 8 includes an intrinsically safe measuring circuitry coupled to the probe 12 and generating the electromagnetic signals. The radar level gauge further has an intrinsically safe radio communication circuitry coupled to its measuring circuitry and including a communication antenna 13 for communicating externally a determined level of the oil 4 relative to the floating roof 5 as a local status of the sensing element location 9 and radar level gauge 8 in question. Other quantities such as high or low level indications may be communicated as the local status. The radar level gauge 8 further has an intrinsically safe power supply circuitry receive power via an intrinsically safe power supply circuitry connection interface for powering the gauge. The radar level gauge is further adapted to receive an intrinsically safe and interchangeable energy storage unit 14 having an intrinsically safe energy storage unit connection interface coupled to said power supply circuitry connection interface.

The system also has monitoring circuitry for receiving said indications of said local status from each of the radar level gauges 8. According to one embodiment of the invention, this monitoring circuitry may at least party be included in each radar level gauge 8. In fact, it is deemed preferable that the radar level gauges 8 are individually capable of determining and communication in case the local status at the sensing element location 9 in question is outside of normal limits. A part of said monitoring system is preferably outside of the radar level gauges 8 or arranged as a subsystem distributed in each one of the radar level gauges 8. Such a part of the monitoring system is adapted for determining an overall monitored status of said floating roof based level values or other local status determined in each radar level gauge.

In order for the system to communicate the local level values, other local statuses, or overall status of the floating roof, the system further has, as part of an off-roof subsystem, a radio communication off-roof circuitry 15 arranged to communicate wirelessly with at least one of the radar level gauges 8 and arranged to convey the said levels and or statuses to a higher level control system 16, typically reachable via a radio gateway 17 and located remotely of the floating roof tank, generally in a non-hazardous environment.

As indicated above and with reference to FIG. 3, a very important feature of the inventive system is the interchangeability of the energy storage units 14. In order for this to work according to an embodiment of the invention, the power supply circuitry connection interface 18 of the radar level gauge 8 and the energy storage unit connection interface 19 of the energy storage unit 14 advantageously has matching intrinsic safety (IS) electrical parameters for enabling de-coupling of said energy storage unit 14 from said power supply circuitry in an intrinsically safe manner in a hazardous or potentially hazardous environment present on top of the floating roof 5. This specific interchangeability is strongly enhanced by the power supply circuitry connection interface having power supply circuitry electro-mechanical contact terminals and said energy storage unit connection interface having energy storage unit electro-mechanical contact terminals arranged to be kept in conductive electric contact with respective power supply circuitry electro-mechanical contact terminals by releasable pressure means. Such pressure means include pin or blade and slotted sleeve combinations. Other means could include leaf spring, coil spring, or pogo pin and contact pad combinations. The energy storage unit 14 is protected and held in place by a threaded cover lid 20 of the radar level gauge 8. The contact terminals of the interfaces 18, 19 can be designed and located so as to come into conductive pressure contact with each other through the action of threading the cover lid 20 onto the radar level gauge 8.

The radar level gauge 8 of the type preferred in this system has an accuracy of about roughly between +/−5 cm and +/−1 mm. This should be approximately adequate for precisely determining any abnormal floating heights of the floating roof 5 and for keeping power consumption down. As a level value is communicated to the control system 16 at a suitable update rate of, for instance, one per minute, the control system 16 can determine that a faulty floating is occurring whenever the level value of one of the radar level gauges is outside of a predetermined allowed range. A level value below such a range at one sensing element location would allow the control system to conclude that the roof floats too high and, for instance, that the floating roof is stuck or that a different part of the roof is floating too high causing an exceedingly low level at the said sensing element location. A level above such a range would allow the control system 16 to conclude that the roof floats too low and, for instance, that the floating roof tends to sink or that a different part of the roof is stuck causing an exceedingly low level at the said sensing element location. Any faulty floating described in the foregoing can be categorized as an alarm by the higher level control system, which may trigger appropriate measures to address an alarm situation.

The system may include a local alarm device in a vicinity of said floating roof tank or even a local emergency shutdown device arranged to control pumps and valves associated with operation of the floating roof tank in dependence of any detection of fault floating of the roof. An indication of any such faulty floating is then communicated via the radio mesh network to the emergency shutdown device to force shutdown of the operation of the floating roof tank.

Advantageously the radio communication in the system is through a radio network of mesh type, wherein a radio repeater circuitry is located at an upper edge of the wall of the floating tank.

Method aspects of the invention cover all the system aspects described and claimed herein. A further method aspect of the invention is the re-powering of the on-roof subsystem of the monitoring system described herein. Such re-powering in the hazardous or potentially hazardous environment present on top of the floating roof includes: receiving an indication from the monitoring system of the need to re-power the monitoring system; starting and keeping a halt of any filling or discharging of the liquid, ensuring that the monitored overall status of the floating roof is within a predetermined normal range; entering into the hazardous or potentially hazardous environment present on the floating roof a replacement intrinsically safe and interchangeable energy storage unit having an intrinsically safe replacement energy storage unit connection interface; de-coupling in the hazardous or potentially hazardous environment present on the floating roof one of the at least one original interchangeable energy storage unit from by separating a respective original energy storage unit connection interface from a respective power supply circuitry connection interface; coupling in the hazardous or potentially hazardous environment present on the floating roof the replacement intrinsically safe and interchangeable energy storage unit to the respective power supply circuitry connection interface; ending said halt of the filling or emptying of the liquid; wherein respective power supply circuitry connection interface, respective original energy storage unit connection interface have matching interface parameters; and wherein respective power supply circuitry connection interface, respective replacement energy storage unit connection interface have matching interface parameters.

The radar gauging technology described above may advantageously be combined with a different type of gauging to achieve even a more complete monitoring of the status of the floating roof. Such different types of gauging are, for instance, pressure gauging for determining roof height relative to tank wall or varying pressure on the roof due to wind, inclinometer gauging for determining local tilt angles of the roof, and gas detection gauging for determining presence of any unwanted gas on the top of the roof.

What is claimed is:

1. Monitoring system for monitoring a floating roof of a floating roof tank containing a liquid and having a bottom, a cylindrical wall, a floating roof floating on said liquid, said system being arranged to determine a local status of said floating roof in at least three spaced apart sensing element locations of said floating roof, and said system comprising an on-roof subsystem comprising:

at least three sensing elements, wherein one of said sensing elements is fixed in each one of said spaced apart sensing element locations on said floating roof, at least one intrinsically safe measuring circuitry, wherein each one of said sensing elements is coupled to at least one of said at least one measuring circuitry for determining in said at least one measuring circuitry said local status of each one of said sensing elements location of said floating roof, at least one intrinsically safe radio communication on-roof circuitry coupled to at least one of said at least one measuring circuitry and including a communication antenna for communicating externally of said on-roof subsystem an indication of at least one of said local status, at least one intrinsically safe power supply circuitry for powering said at least one measuring circuitry and said at least one radio communication circuitry, and having an intrinsically safe power supply circuitry connection interface, at least one original intrinsically safe and interchangeable energy storage unit having an intrinsically safe original energy storage unit connection interface coupled to said power supply circuitry connection interface, said monitoring system further comprising:

monitoring circuitry for receiving said indications of said local status from each of said sensing elements and for determining an overall monitored status of said floating roof based on at least one of said indications of said local status, said monitoring system further comprising an off-roof subsystem comprising:

a radio communication off-roof circuitry arranged to communicate wirelessly with at least one of said sensing elements and arranged to convey externally of said on-roof subsystem at least one of said indications of said local status or said monitored overall status of said floating roof, wherein said monitoring system is configured to provide a receivable indication of the need to re-power said monitoring system, wherein a replacement intrinsically safe and interchangeable energy storage unit having an intrinsically safe replacement energy storage unit connection interface is capable of being entered into a hazardous or potentially hazardous environment present on said floating roof, wherein at least one of said at least one original interchangeable energy storage unit is capable of being de-coupled in said hazardous or potentially hazardous environment present on said floating roof by separating a respective original energy storage unit connection interface from a respective power supply circuitry connection interface, wherein said replacement intrinsically safe and interchangeable energy storage unit is capable of being coupled in said hazardous or potentially hazardous environment present on said floating roof by connecting said intrinsically safe replacement energy storage unit connection interface to said respective power supply circuitry connection interface, wherein respective power supply circuitry connection interface, respective original energy storage unit connection interface have matching interface parameters, and wherein respective power supply circuitry connection interface, respective replacement energy storage unit connection interface have matching interface parameters.

2. The system of claim 1, wherein said power supply circuitry connection interface and said energy storage unit connection interface have matching electrical parameters for enabling de-coupling said energy storage unit from said power supply circuitry in an intrinsically safe manner in said hazardous or potentially hazardous environment.

3. The system of claim 1, wherein said power supply circuitry connection interface comprises power supply circuitry electro-mechanical contact terminals and said energy storage unit connection interface comprises energy storage unit electro-mechanical contact terminals to be kept in conductive electric contact with respective power supply circuitry electro-mechanical contact terminals by releasable pressure means to facilitate interchangeability of said energy storage unit.

4. The system of claim 1, wherein said sensing elements and said measuring circuitry are arranged for determining as said local status a level of said liquid in relation to said floating roof at said sensing element location and communicate at least an indication of said level belonging to a high level range or a low level range.

5. The system of claim 1, wherein said sensing elements and said measuring circuitry are arranged for determining as said local status a level of said liquid in relation to said floating roof at said sensing element location and communicate at least an indication of said level belonging to a high level range, an intermediate level range, or a low level range.

6. The system of claim 1, wherein said sensing elements and said measuring circuitry are arranged for determining as said local status a level of said liquid in relation to said floating roof at said sensing element location and communicate a continuous indication of said level with a predetermined accuracy belonging to a range of 0.0001-0.1 meters.

7. The system of claim 1, wherein said sensing elements and said measuring circuitry are arranged for determining as said local status at least one threshold level of said liquid in relation to said floating roof at said sensing element location and communicate at least an indication of said at least one threshold level, and wherein at least one threshold level value of said at least one threshold level is adjustable by mechanical or electrical means.

8. The system of claim 1, wherein said on-roof subsystem further comprises at least one gauging unit, whereof each one is located at one of said sensing element location and wherein each one of said gauging units includes said sensing element and said measuring circuitry.

9. The system of claim 1, wherein at least one of said gauging units further includes one of said power supply circuitry.

10. The system of claim 1, wherein at least one of said gauging units further includes one of said radio communication on-roof circuitry.

11. The system of claim 1, wherein at least one of said gauging units further includes at least one of said energy storage unit.

12. The system of claim 1, wherein at least one of said gauging units further includes said monitoring circuitry.

13. The system of claim 1, wherein said on-roof subsystem further comprises electrical wiring for interconnecting circuitry located at at least two of said sensing element locations.

14. The system of claim 1, wherein a communication function of said on-roof subsystem is completely wireless in relation to any off-roof electrical circuitry.

15. The system of claim 1, wherein a power supply function of said on-roof subsystem is completely wireless in relation to any off-roof electrical circuitry.

16. The system of claim 1, wherein
said indication of said monitored status of said floating roof includes a first alarm status of said level of said liquid exceeding a predetermined high value.

17. The system of claim 1, wherein
said indication of said monitored status of said floating roof includes a second alarm status of said level of said liquid is less than a predetermined low value.

18. The system of claim 1, wherein said at least one radio communication on-roof circuitry and said radio communication off-roof circuitry forming at least part of a radio network of mesh type.

19. The system of claim 1, wherein said radio communication off-roof circuitry is at least one radio repeater circuitry.

20. The system of claim 1, wherein said radio communication off-roof circuitry is located at a top of said tank wall.

21. The system of claim 1, wherein said off-roof subsystem comprises further radio communication system circuitry, wherein said radio communication on-roof circuitry is arranged to communicate with said radio communication off-roof circuitry and said radio communication system circuitry.

22. The system of claim 1, wherein said monitoring system further comprises:
a local alarm device arranged to produce an alarm signal in a vicinity of said floating roof tank in dependence of at least one of said indications of said local status or said monitored overall status of said floating roof,
said radio communication off-roof circuitry is arranged to convey to said local alarm device at least one of said indications of said local status or said monitored overall status of said floating roof.

23. The system of claim 1, wherein said monitoring system further comprises:
a local emergency shutdown device arranged to control at least one of a pump and a valve associated with operation of said floating roof tank in dependence of at least one of said indications of said local status or said monitored overall status of said floating roof,
said radio communication off-roof circuitry is arranged to convey to said emergency shutdown device at least one of said indications of said local status or said monitored overall status of said floating roof.

24. The system of claim 1, wherein said sensing elements operate according to at least one gauging technology in the set consisting of: continuous non-contacting radar level gauging, switch non-contacting radar level gauging, continuous guided wave radar gauging, switch guided radar level gauging, ultrasonic level gauging, switch vibrating fork gauging, pressure gauging, capacitive gauging, laser gauging, inclinometer gauging, gas detection gauging.

25. Method of monitoring a floating roof of a floating roof tank containing a liquid and having a bottom, a side wall, a floating roof floating on said liquid, said method comprising:
determining a local status of said floating roof in at least three spaced apart sensing element locations of said floating roof, said method comprising arranging on said floating roof:
at least three sensing elements, wherein one of said sensing elements is fixed in each one of said spaced apart sensor element locations on said floating roof,
at least one intrinsically safe measuring circuitry, wherein each one of said sensing elements is coupled to said at least one measuring circuitry for determining in said at least one measuring circuitry said local status of each one of said sensor elements location of said floating roof,
at least one intrinsically safe radio communication on-roof circuitry coupled to at least one of said at least one measuring circuitry and including a communication antenna for communicating externally of said on-roof system an indication of at least one of said local status,
at least one intrinsically safe power supply circuitry for powering said at least one measuring circuitry and said at least one radio communication circuitry, and having an intrinsically safe power supply circuitry connection interface,
at least one original intrinsically safe and interchangeable energy storage unit having an intrinsically safe original energy storage unit connection interface and coupling said intrinsically safe energy storage unit connection interface to said power supply circuitry connection interface,
said method further comprising arranging:
monitoring circuitry and thereby receiving said indications of said local status from each of said sensor units and for determining an overall monitored status of said floating roof based on at least one of said indications of said local status,
said method further comprising arranging off said floating roof:
a radio communication off-roof circuitry and thereby communicating wirelessly with at least one of said sensor units and arranged to convey externally of said on-roof subsystem at least one of said indications of said local status or said monitored overall status of said floating roof,
wherein an indication from said monitoring system of the need to re-power said monitoring system is received,
wherein a replacement intrinsically safe and interchangeable energy storage unit having an intrinsically safe replacement energy storage unit connection interface is entered into a hazardous or potentially hazardous environment present on said floating roof,
wherein one of said at least one original interchangeable energy storage unit is de-coupled in said hazardous or potentially hazardous environment present on said floating roof by separating a respective original energy storage unit connection interface from a respective power supply circuitry connection interface,
wherein said replacement intrinsically safe and interchangeable energy storage unit is coupled in said hazardous or potentially hazardous environment present on said floating roof by connecting said intrinsically safe replacement energy storage unit connection interface to said respective power supply circuitry connection interface,
wherein respective power supply circuitry connection interface, respective original energy storage unit connection interface have matching interface parameters, and wherein respective power supply circuitry connection interface, respective replacement energy storage unit connection interface have matching interface parameters.

26. Method of re-powering a monitoring system for monitoring a floating roof of a floating roof tank containing a liquid and having a bottom, a cylindrical wall, a floating roof floating on said liquid, said system being arranged to determine a local status of said floating roof in at least three spaced apart sensing element locations of said floating roof, and said system comprising an on-roof subsystem comprising:

at least three sensing elements, wherein one of said sensing elements is fixed in each one of said spaced apart sensor element locations on said floating roof, at least one intrinsically safe measuring circuitry, wherein each one of said sensing elements is coupled to said at least one measuring circuitry for determining in said at least one measuring circuitry said local status of each one of said sensing elements location of said floating roof, at least one intrinsically safe radio communication on-roof circuitry coupled to at least one of said at least one measuring circuitry and including a communication antenna for communicating externally of said on-roof subsystem an indication of at least one of said local status, at least one intrinsically safe power supply circuitry for powering said at least one measuring circuitry and said at least one radio communication circuitry, and having an intrinsically safe power supply circuitry connection interface, at least one original intrinsically safe and interchangeable energy storage unit having an intrinsically safe original energy storage unit connection interface coupled to said power supply circuitry connection interface, said monitoring system further comprising:

monitoring circuitry for receiving said indications of said local status from each of said sensing elements and for determining an overall monitored status of said floating roof based on at least one of said indications of said local status, said monitoring system further comprising an off-roof subsystem comprising:

a radio communication off-roof circuitry arranged to communicate wirelessly with at least one of said sensing elements and arranged to convey externally of said on-roof subsystem at least one of said indications of said local status or said monitored overall status of said floating roof, said method comprising:

receiving an indication from said monitoring system of the need to re-power said monitoring system, entering into a hazardous or potentially hazardous environment present on said floating roof a replacement intrinsically safe and interchangeable energy storage unit having an intrinsically safe replacement energy storage unit connection interface de-coupling in said hazardous or potentially hazardous environment present on said floating roof one of said at least one original interchangeable energy storage unit by separating a respective original energy storage unit connection interface from a respective power supply circuitry connection interface, coupling in said hazardous or potentially hazardous environment present on said floating roof said replacement intrinsically safe and interchangeable energy storage unit by connecting said intrinsically safe replacement energy storage unit connection interface to said respective power supply circuitry connection interface, wherein respective power supply circuitry connection interface, respective original energy storage unit connection interface have matching interface parameters, and wherein respective power supply circuitry connection interface, respective replacement energy storage unit connection interface have matching interface parameters.

* * * * *